United States Patent [19]

Welsch

[11] Patent Number: 4,595,107

[45] Date of Patent: Jun. 17, 1986

[54] UTILITY CART

[75] Inventor: John H. Welsch, Springbrook Township, Lackawanna County, Pa.

[73] Assignee: InterMetro Industries Corp., Wilkes-Barre, Pa.

[21] Appl. No.: 670,906

[22] Filed: Nov. 13, 1984

[51] Int. Cl.[4] ............................................. A47F 5/01
[52] U.S. Cl. .................................... 211/187; 108/144; 211/181; 280/47.35; 280/79.3
[58] Field of Search ............... 211/186, 187, 181, 189; 108/111, 144; 280/47.35, 79.3

[56] References Cited

U.S. PATENT DOCUMENTS

| 2,872,252 | 2/1959 | Konkle | 108/144 X |
|---|---|---|---|
| 3,424,111 | 1/1969 | Maslow . | |
| 3,523,508 | 8/1970 | Maslow | 108/144 |
| 3,664,274 | 5/1972 | Bustos | 108/144 |
| 3,757,705 | 9/1973 | Maslow | 108/144 |
| 3,874,511 | 4/1975 | Maslow | 108/144 X |
| 3,927,769 | 12/1975 | Maslow et al. . | |
| 3,981,511 | 9/1976 | Foster | 280/79.3 |
| 4,318,352 | 3/1982 | Friedman et al. | 108/111 |

FOREIGN PATENT DOCUMENTS 2034099 1/1972 Fed. Rep. of Germany ... 280/47.35

OTHER PUBLICATIONS

Metropolitan Wire Corporation, Assembly Instructions, Utility Carts, MW Series 10–79.
Metropolitan Wire Goods Corporation, Catalog Sheet, "Assembly Instructions—Utility Carts".

Primary Examiner—Robert W. Gibson, Jr.
Attorney, Agent, or Firm—Fitzpatrick, Cella, Harper & Scinto

[57] ABSTRACT

A utility cart has four corner posts, a handle having a pair of elongate legs and coupling plugs for positioning the distal ends of the handle legs in aligned proximate disposition relative to a pair of corner posts. Support members engage the exterior of the corner posts against axial movement relative thereto and interlock with the handle legs thus to secure the corner posts to the handle. The support members also serve to support a corner of a shelf to each of the four corner posts.

29 Claims, 13 Drawing Figures

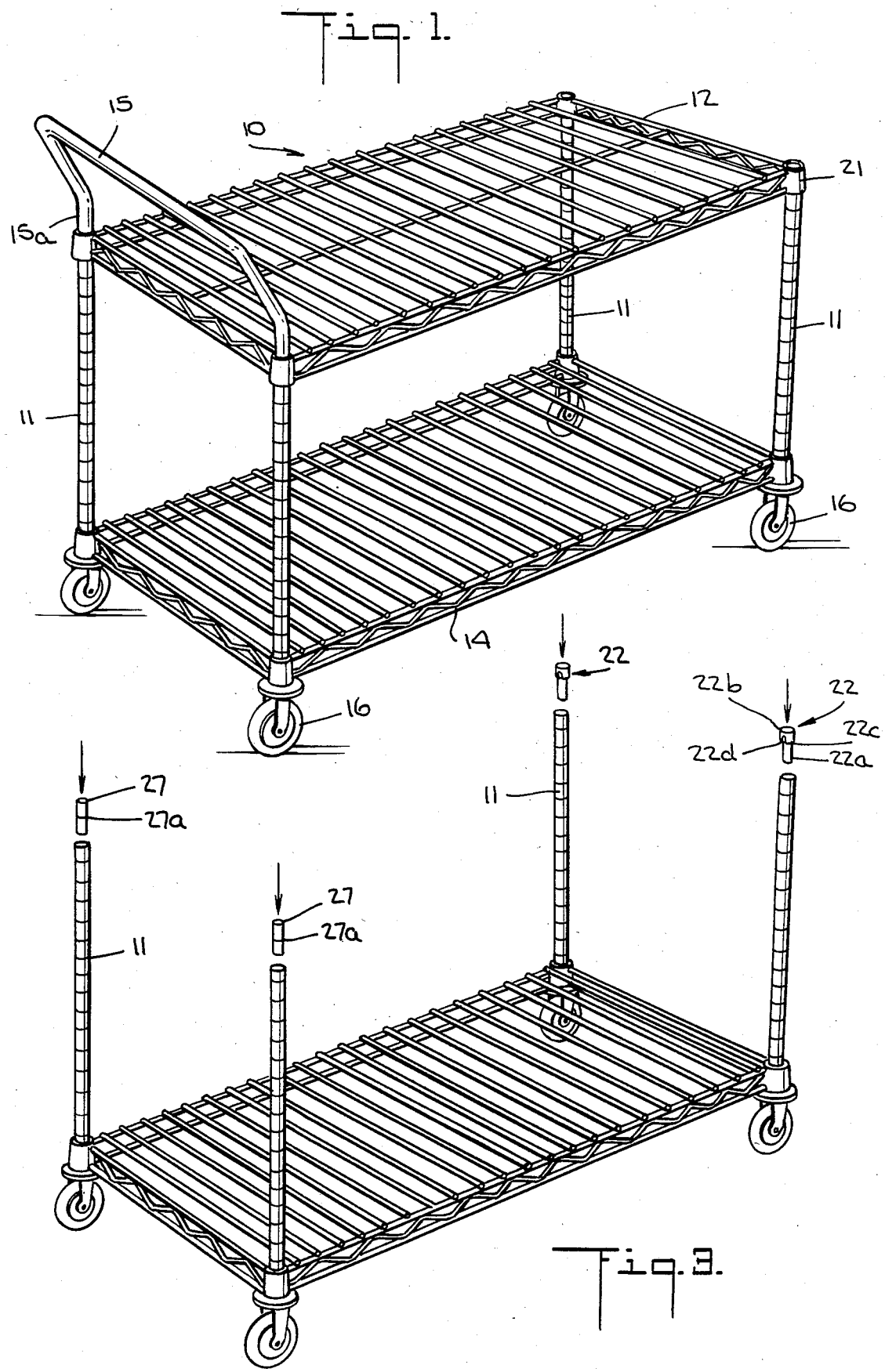

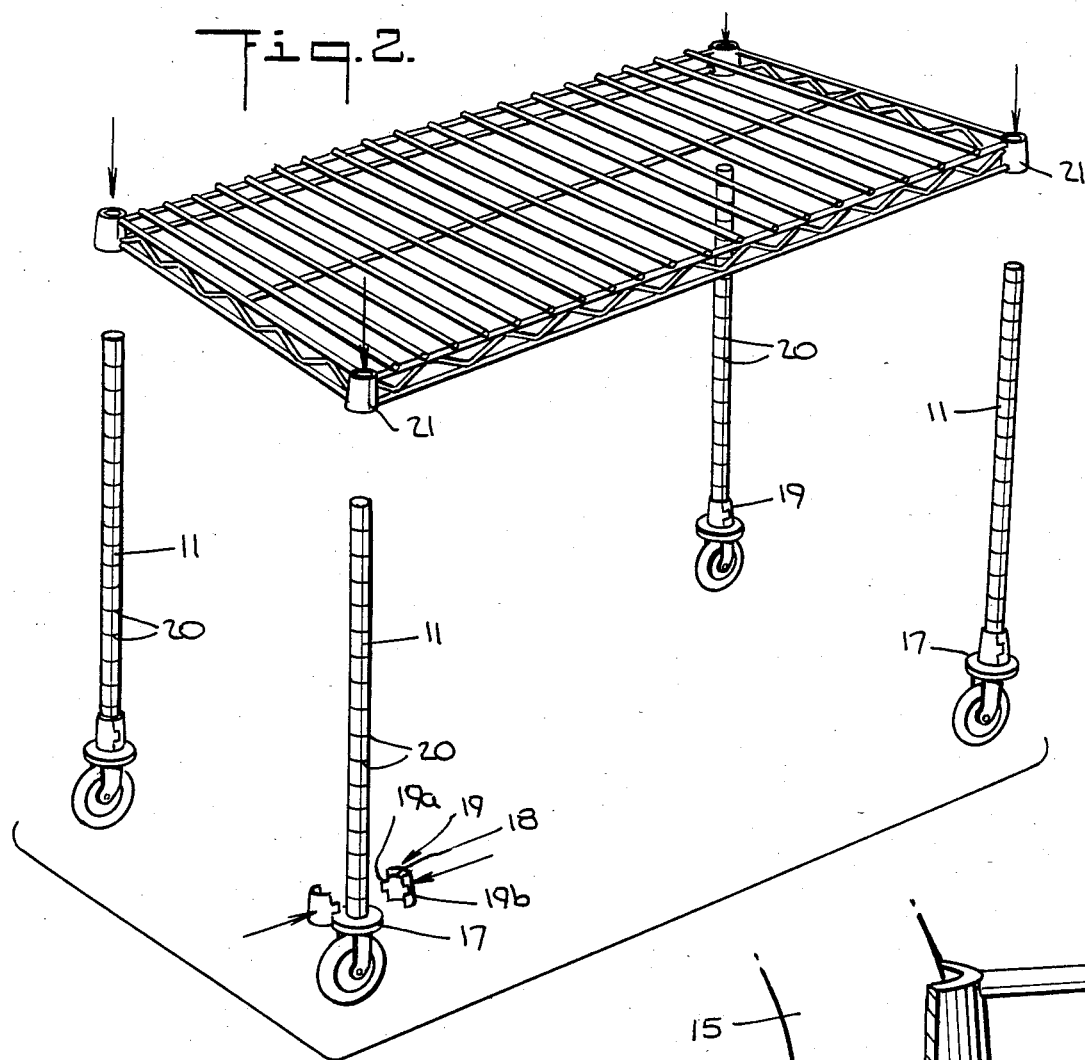
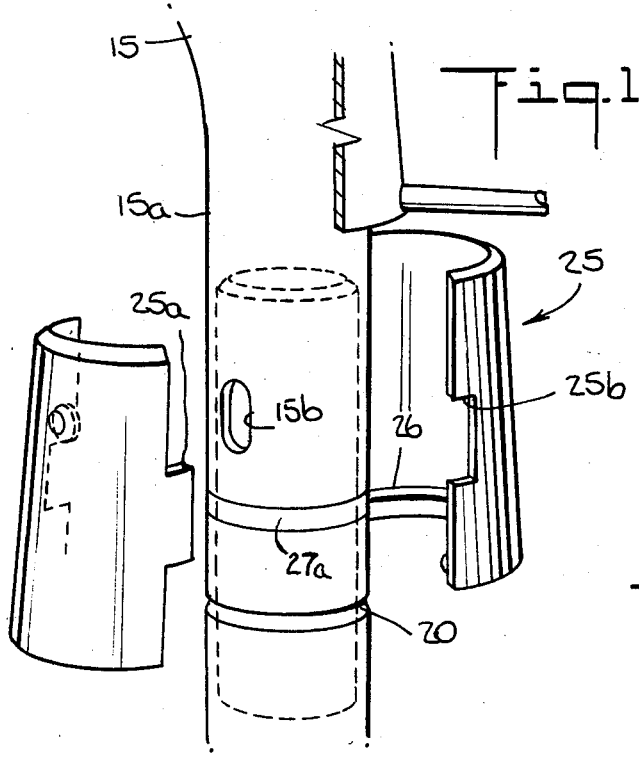
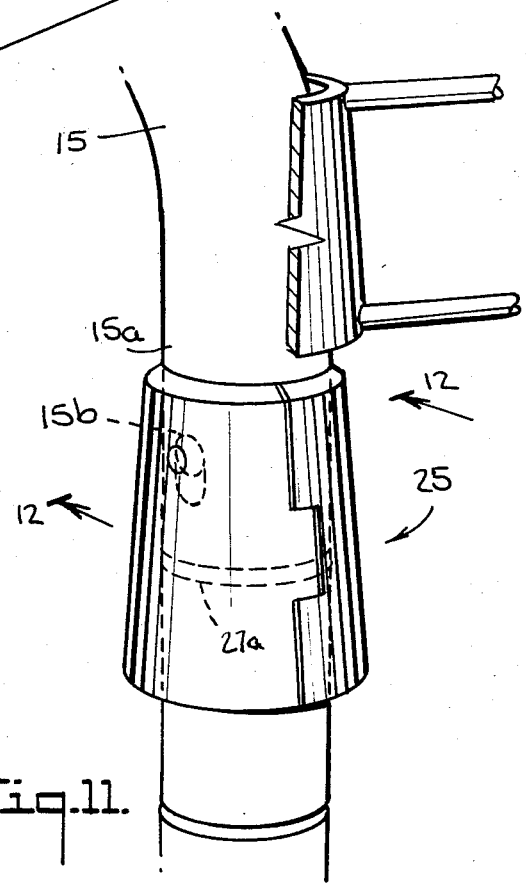

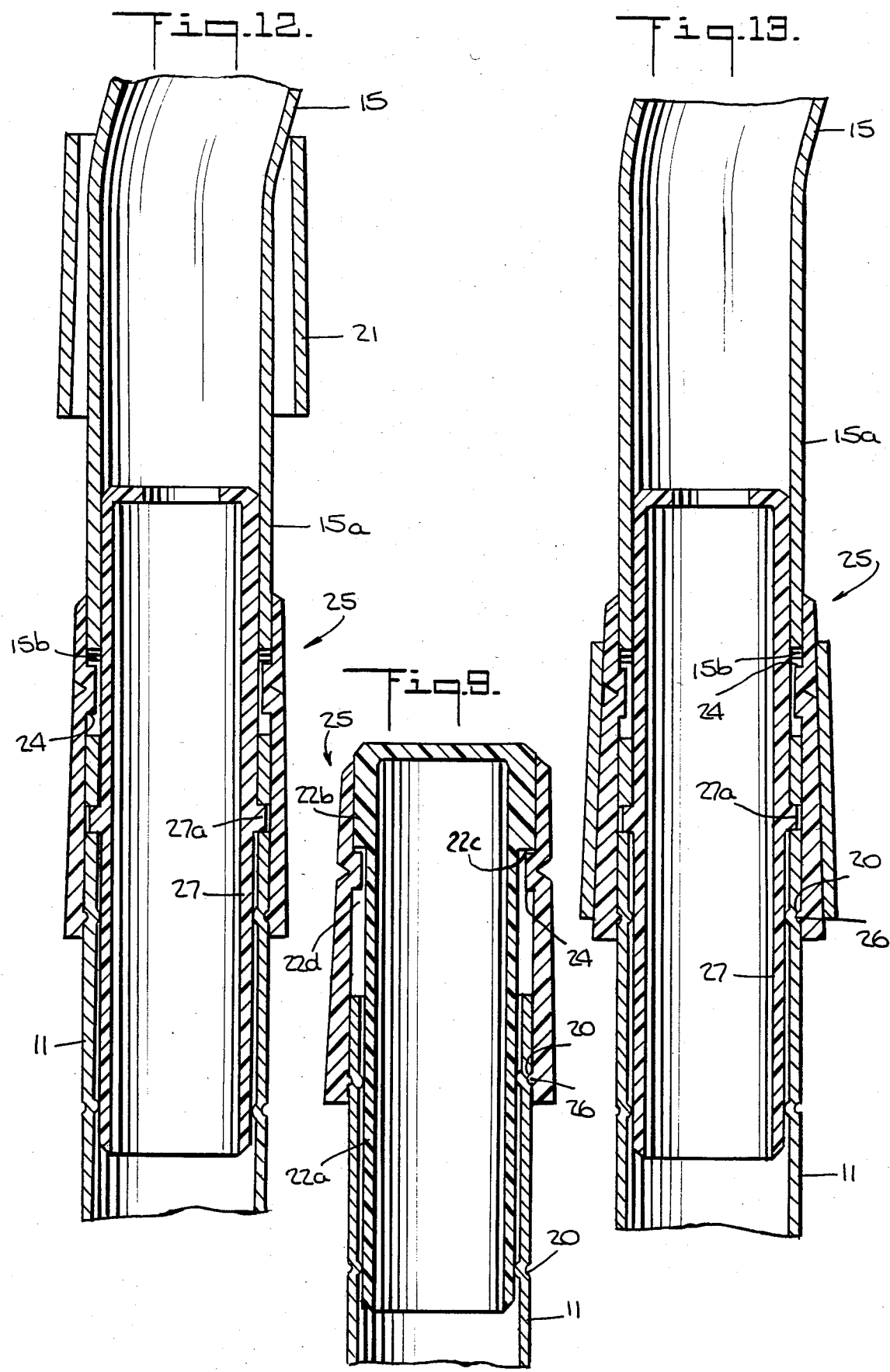

UTILITY CART

BACKGROUND OF THE INVENTION

1. Field of the Invention

The present invention pertains generally to devices for transporting portable articles and finds application in facilities such as hospitals, hotels, schools and the like, and pertains more particularly to a knock-down utility cart that is easy to manufacture, easy to ship in knocked-down condition from the point of manufacture to the point of use and that can readily be assembled and later disassembled for compact storage.

2. Description of the Prior Art

Utility carts of the class described are provided with four casters and may include four corner posts, a handle at one or both ends of the cart and two or more shelves supported by the corner posts. Such carts have been manufactured of all welded construction or in knock-down form.

One serious drawback of the all welded construction resides in the fact that the carts are expensive to warehouse and ship because of their size. Additionally, they may not be disassembled for compact storage when not in use.

With respect to the knock-down carts, it is known to provide U-shaped members at one or both ends, the legs of such members serving as a pair of corner posts and the bight serving as a handle. Each such U-shaped member may be provided with vertically spaced exterior annular grooves on the vertical legs to engage with tapered sleeves or post supports, as shown in U.S. Pat. Nos. 3,424,111 (Maslow), and 3,874,511 (Maslow), used to support shelves.

Several problems result from the use of these U-shaped members. First, because these members are made by rolling the grooves into a straight length of tubing and then bending the tube into its final shape, and because the accuracy of bending is dependent on several factors including the mechanical properties of the tubing, it sometimes occurs that the legs are not of precisely the same length or that the grooves in the respective legs do not precisely align horizontally. As a result, in one instance, all four casters do not engage the floor and consequently the cart wobbles, and in another instance, the four corners of a shelf do not engage uniformly with the associated tapered sleeves or post supports.

Second, since the bight of the U-shaped members precludes the placement of shelves over the top of the posts, carts employing the U-shaped members are normally assembled by the user from the bottom up, each shelf being positioned on the four straight corner posts in order from the top shelf down. This is a difficult procedure.

Finally, use of the U-shaped members necessitates that the casters be installed by the user at the bottom of the corner posts since, if they were installed at the factory, it would be impossible for the user to install the shelves. Installation of the casters has been found to be an especially troublesome procedure for those not familiar with appropriate techniques.

Constructions have been proposed in the past in which each U-shaped member was formed as three pieces, namely one U-shaped handle and two separate corner posts. In such constructions, a tubular coupling axially split at both ends was inserted with a resilient friction fit into respective mating ends of the handle and each corner post. This structure was not entirely satisfactory, however, because it was difficult to assemble due to the friction fits between the coupling and corner posts and handle. Moreover, the handle could be dislodged from the couplings and corner posts, despite the friction fits, if the handle was lifted for any reason.

Other teachings of interest in respect of the present disclosure are found in U.S. Pat. Nos. 3,523,508 (Maslow) and 3,927,769 (Maslow).

SUMMARY OF THE INVENTION

Accordingly, it is an object of the present invention to provide a utility cart that overcomes the foregoing difficulties and disadvantages.

It is another object of the invention to provide such a cart which is sturdy, displays great rigidity in all directions and may readily and conveniently be assembled and disassembled by the user.

The improved utility cart of the present invention comprises a pair of corner posts, a handle having a pair of elongate legs and coupling means for positioning the distal ends of the handle legs in aligned proximate disposition with respect to the ends of the corner posts. Support means are also provided for supporting shelf corners and these are also adapted to engage the exterior of the corner posts against axial movement relative thereto.

Actually, of course, the cart may include four corner posts and a handle may be connected to a pair of such posts at either or both ends of the cart, the support means being applied to each of the four corner posts to support the corners of a shelf in a horizontal plane. If only one handle is used, post caps are provided at the top of the corner posts to which a handle is not connected and these caps are adapted to be connected to shelf support means.

The invention also contemplates means associated with the support means and the distal ends of the handle legs to interlock the handle and the associated support means. Thus, since the support means and corner posts are engaged against relative axial movement and the support means and handle legs are interlocked, the handle is effectively fixed against unintentional removal from its aligned, proximate disposition with respect to the corner posts.

The foregoing and other objects and advantages of the invention will be more clearly understood from a consideration of the following detailed description of the preferred embodiment taken in conjunction with the accompanying figures.

BRIEF DESCRIPTION OF THE DRAWING

A specific embodiment of the invention has been chosen for purposes of illustration and description, and is shown in the accompanying drawing, forming a part of the specification wherein:

FIG. 1 is a perspective view of an assembled utility cart according to an embodiment of the present invention and having a handle at one end;

FIG. 2 is a perspective, exploded view of a partially assembled cart of FIG. 1;

FIG. 3 is a perspective view of a partially assembled utility cart illustrating the coupling means and post caps in exploded disposition relative to corner posts at respective ends of the cart;

FIG. 9 is a cross sectional view taken along plane 9—9 of FIG. 8;

FIG. 10 is a partially exploded detailed view of the top of a corner post fitted with coupling means and illustrating the support means and a portion of a shelf and handle ready for assembly;

FIG. 11 is a view similar to FIG. 10 but illustrating the support means in assembled disposition;

FIG. 12 is a cross-sectional view taken along plane 12—12 of FIG. 11; and

FIG. 13 is a cross-sectional view similar to FIG. 12 but showing the parts fully assembled.

DETAILED DESCRIPTION OF THE PREFERRED EMBODIMENT

Figure 4:
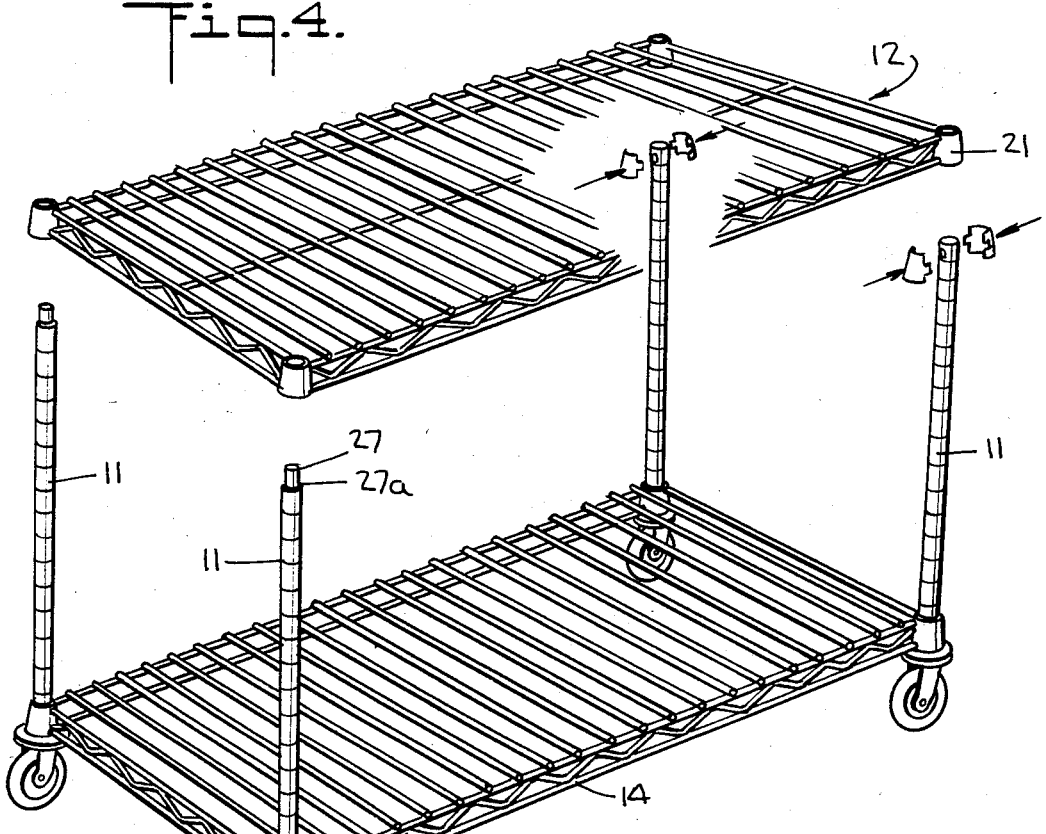
FIG. 4 is a view similar to FIGS. 2 and 3 but illustrating the coupling means and post caps in place and the support means ready for assembly to a pair of corner posts.

Referring now to the drawing, and especially to FIG. 1 thereof, there is shown an assembled utility cart 10 having four corner posts 11, upper and lower shelves 12 and 14, a single handle 15 and four casters 16. The shelves 12 and 14 are supported on the corner posts 11 in a manner later to be described. It will be noted that the corner posts are formed of straight tubing and the handle 15 is also formed of tubing but is bent into a U-shape. The free ends of the legs of the handle form an extension of the upper ends of two corner posts at one end of the cart.

Turning now to FIG. 2, it is seen that the casters 16 are connected to the lower ends of the four corner posts, which are surmounted by circular discs 17 formed of rubber or the like to serve as bumpers for the cart.

The lower end of each corner post is equipped with at least one bottom split support member or collar 19 which is formed of a pair of semi-tubular sections having closely interfitting tabs 19a and recesses 19b that enable the semi-tubular sections to be joined around a corner post. The interior surface of the tube formed by thus joining the semi-tubular sections is formed with an annular rib or projection 18 in the upper region thereof (FIG. 2) and that engages a selected one of a number of vertically spaced, horizontal recesses 20 formed in each corner post 11 to prevent the support members from moving axially along their respective posts. The exterior surface of each support member 19 tapers outwardly downwardly so that mating sleeves 21 at the corners of the lower shelf closely engage those surfaces whereby the shelf is supported horizontally at a level determined by the corner post grooves 20 selected for engagement by the support member ribs 18.

Figure 7:
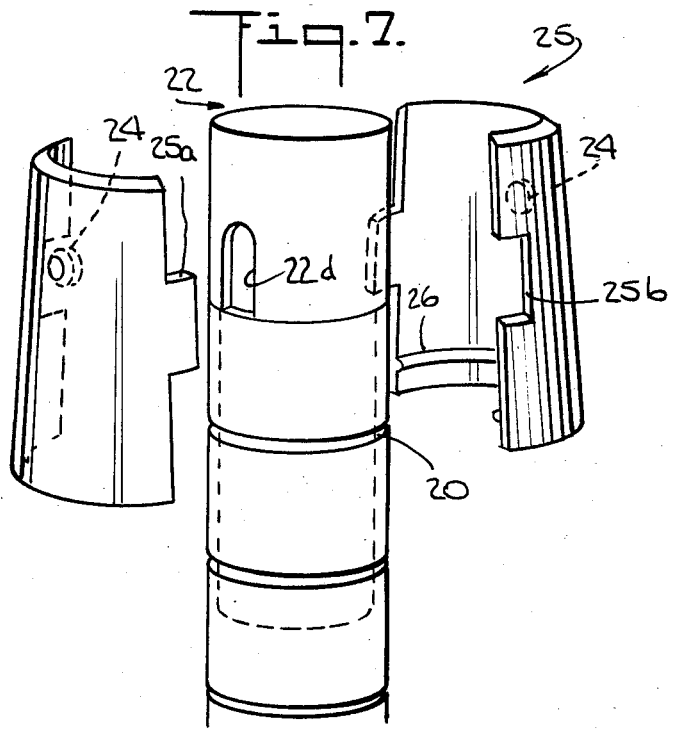
FIG. 7 is a detailed view of the top of a corner post with a post cap in place and the split support means ready for assembly.

As shown in FIGS. 3 to 9, the corner posts 11 that are not intended to support a handle are fitted with post caps 22 each constituted by a cylindrical section 22a adapted to fit within the upper ends of the corner posts, and an enlarged head 22b providing a shoulder 22c for overlying the upper end of the corner post. A pair of diametrically opposed vertical slots 22d are formed in the enlarged head and these slots receive a projection or button 24 extending radially inwardly of each of semi-tubular sections constituting top support members 25, as best shown in FIG. 7. These support members 25 are similar to those designated by reference numeral 19 except that the support means 25 are equipped with opposed, internal projections or buttons 24 and with the ribs 26 disposed near the lower end.

Figure 8:
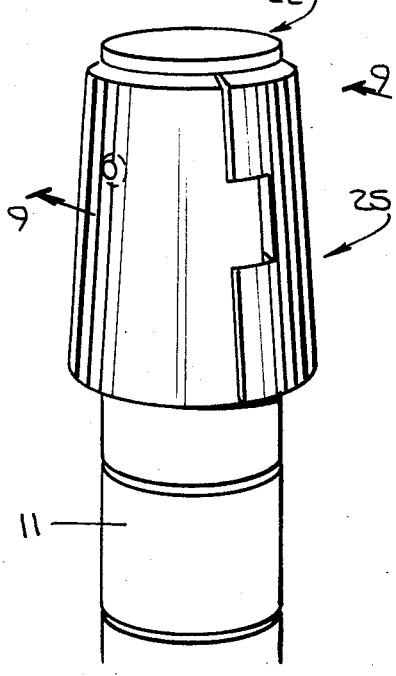
FIG. 8 is a view similar to FIG. 7 but illustrating the support means in assembled disposition.

As seen in FIGS. 7, 8 and 9, when the support members 25 are assembled to the posts 11 and post caps 22, the tabs 25a interfitting with the recesses 25b, the rib 26 engages with the topmost corner post groove 20 and, as mentioned, the buttons 24 enter the slots 22d of the caps 22, the support members serving to support tapered sleeves 21 at the corners of the upper shelf 12 while the caps 22 close off the tops of the associated tubular corner posts 11.

FIGS. 3, 4 to 6 and 10 to 13 best illustrate the arrangement for supporting a handle 15 at one end of the cart 10. As seen in FIGS. 3 and 4, the tubular corner posts 11 at the left side of the cart, as shown, are each provided at their upper ends with a cylindrical coupler plug 27 formed with an annular, radial flange 27a projecting from its center. One end of a plug 27 is inserted into the upper end of each corner post 11 at the end of the cart to which a handle will be fixed, so that the flange 27a abuts against the top of the respective post, as shown in FIG. 4.

As shown in FIGS. 10 to 13, the support members 25 are structured to engage the post 11 so that the internal, annular rib 26 is received in the uppermost groove 20 of the associated post 11, with the distal ends 15a of the legs of the handle 15 telescoping over the exposed portion of the coupler plugs 27 and resting on the top surface of the flange 27a.

Figure 5:
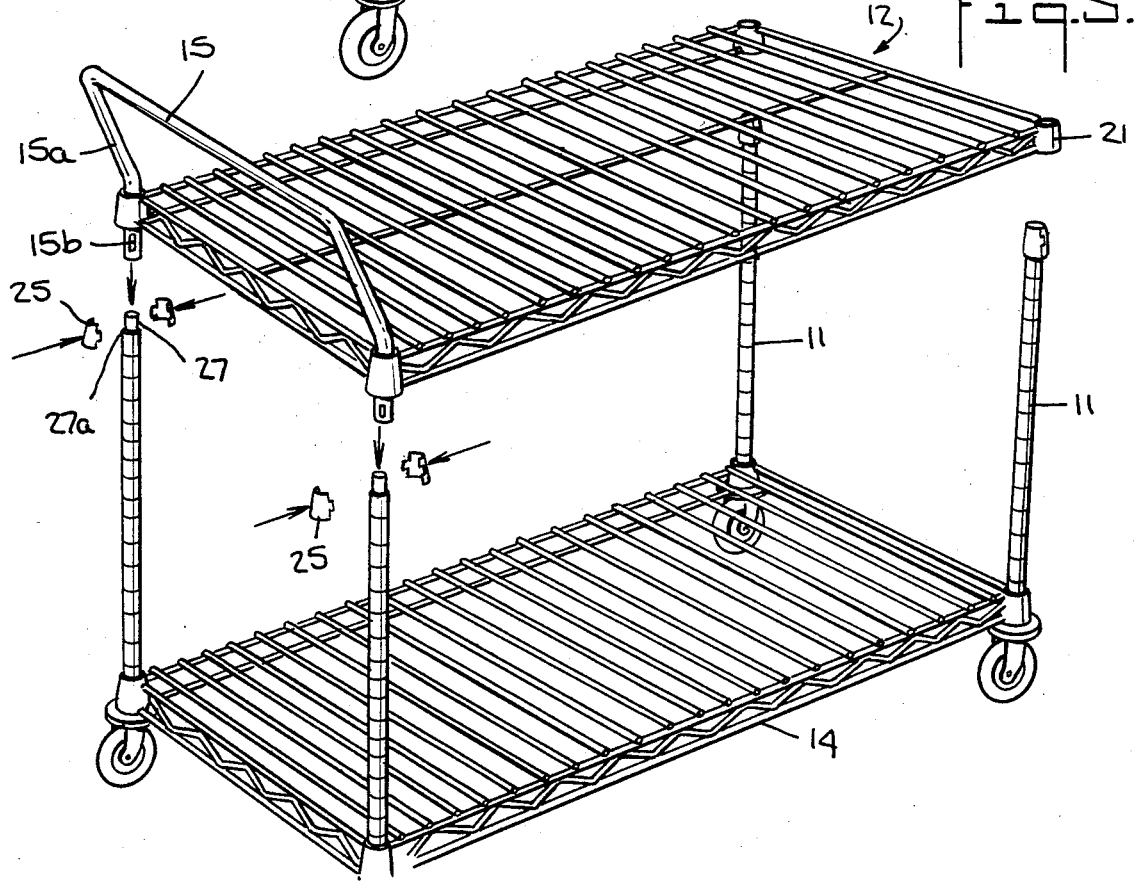
FIG. 5 illustrates the cart with a top shelf about to be assembled to the corner posts and a handle inserted through sleeves on the top shelf and in exploded disposition relative to a pair of corner posts.
Figure 6:
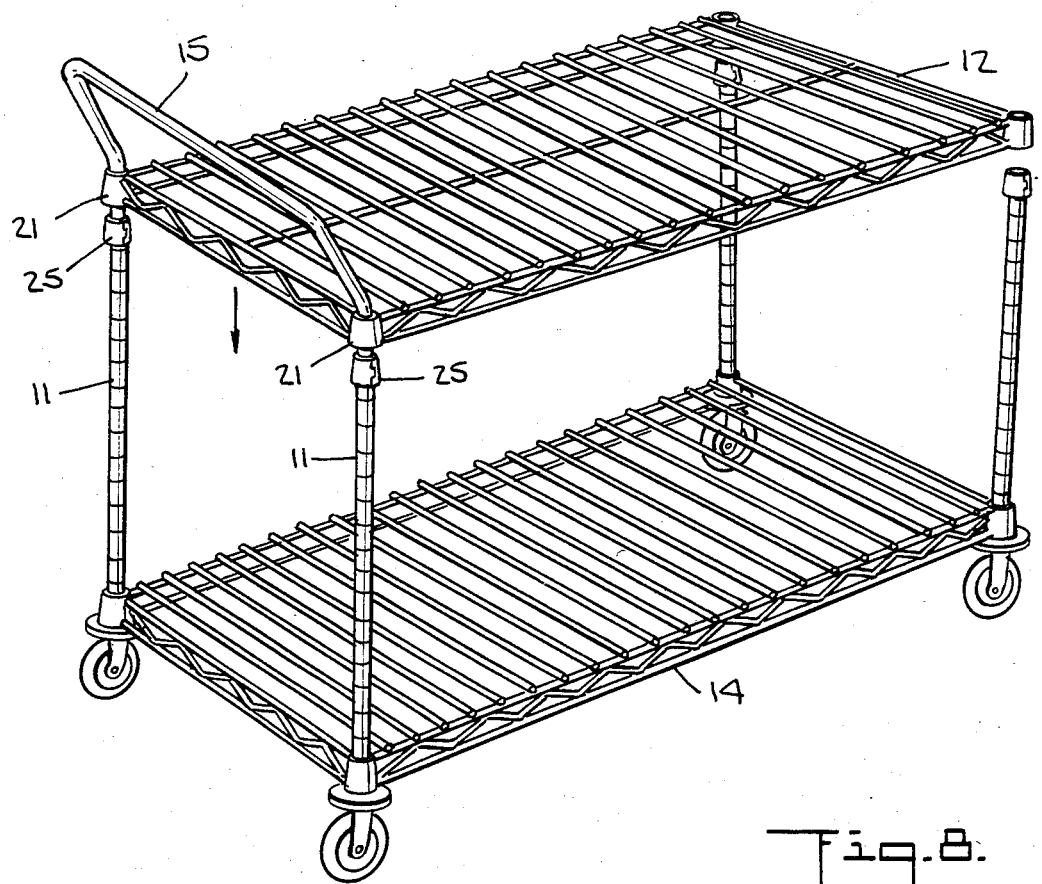
FIG. 6 illustrates the handle assembled to a pair of corner posts and support means assembled to the corner posts carrying the handle with the top shelf about to be lowered into its final position.

The legs of the handle 15 are formed with diametrically opposed bores 15b, as seen for example in FIG. 5, and these serve to receive the internal projections or buttons 24 of the support members 25 as shown in FIGS. 12 and 13.

As already mentioned, the exterior surfaces of the support members 25 are tapered to receive mating interior surfaces of sleeves 21 at the corners of the shelves 12.

By reason of the arrangement as thus far described, the top shelf 12 is firmly supported horizontally and against axial movement on the four corner posts 11 while the handle 15 is fixed to the tops of two end corner posts.

More particularly, a downward load on the top shelf causes the support members 25 to be tightly urged radially inwardly against the corner post due to engagement of the complementary tapered surfaces of the sleeve on the top shelf and on the support members. Therefore the ribs 26 are firmly urged into the uppermost grooves 20 on the corner posts so that the support members are secured against axial movement relative to the corner posts. Furthermore, the buttons 24 on the interior of the support members are firmly urged into the complementary bores 15a in the legs of the handle so that the handle is secured against axial movement relative to the support members and hence the corner posts.

The cart 10 may be shipped in knocked down condition except that the casters 16 are inserted at the lower ends of the corner posts 11 at the factory. To assemble the cart, the user proceeds as follows:

The bottom support members 19 are secured to the corner posts at a desired vertical level by bringing the split sections together around respective posts so that the internal ribs 18 thereof mate with selected grooves 20 of the posts. Corner sleeves of the lower shelf 14 are then telescoped over the corner posts from the top and lowered until the mating tapered surfaces of the sleeves and support members firmly engage.

Next, the coupler plugs 27 are inserted into the top ends of the corner posts 11 that are to support the handle 15 (FIGS. 3 and 4) and the end caps 22 are inserted into the top ends of the two remaining corner posts (assuming only one handle is to be mounted.)

A pair of split support members 25 are then applied to the corner posts carrying the end caps 22 so that the internal ribs 26 of the members 25 engage the uppermost grooves 20 in those posts and the projections or buttons 24 enter the grooves 22d of the caps.

The legs 15a of the handle are then inserted into a respective two of the sleeves 21 on the top shelf 12 (FIG. 5). The handle legs 15a are telescoped over the exposed portions of the coupler plugs while the top shelf is held in a slightly elevated position and support members 25 are applied to the upper ends of the posts 11 (FIG. 6) so that projections 24 enter bores 15b in the handle legs 15a and ribs 26 enter topmost grooves 20 in the posts thus locking the posts, support members and handle together (FIG. 12). The top shelf and its associated sleeves 21 are then lowered over the support members 25 into mating engagement therewith (FIG. 13).

It will be appreciated that the lower shelf may be positioned at any selected position axially of the corner posts and that additional shelves may be mounted in a fashion similar to that described with respect to the mounting of the lower shelf.

From the foregoing description, it will be seen that the present invention provides a utility cart with a separate handle, that is, one which is not formed as an integral part of the corner posts and by reason of which the cart may be shipped in knocked down condition and readily assembled by the user into a device having structural integrity. The handle, once assembled with other components, is firmly fixed to the assembly. The cart may, moreover, be easily disassembled for compact storage.

The present invention also provides the advantage that the corner posts are universal. That is four identical corner posts may be shipped to a user regardless of whether he wishes a cart with one or two handles. Therefore, problems in inventory are reduced.

Although a specific embodiment of the present invention has been described above in detail, this is only for purposes of illustration. Modifications can be made to the described structure to adapt it to particular applications.

What is claimed is:

1. A utility cart comprising:
   a shelf;
   first and second pairs of corner posts;
   a handle having a pair of elongate legs;
   coupling means for positioning the distal ends of said handle legs in aligned, proximate disposition with respect to the ends of said first pair of corner posts;
   first support means adapted to engage the exterior of each of said first pair of corner posts against axial movement relative thereto;
   second support means adapted to engage the exterior of each of said second pair of corner posts against axial movement relative thereto; and
   means associated with said first support means and the distal ends of said handle legs to interlock said handle and said first support means, whereby said handle and said first pair of corner posts are fixed against removal from said aligned, proximate disposition and whereby said first and second support means engaging respectively said posts of said first and second pairs of corner posts are adapted to support said shelf in horizontal dispostion therebetween.

2. A utility cart according to claim 1, wherein each said corner post is formed with a recess and each of said first and second support means is formed with a corresponding projection adapted to engage with the recess of a corner post; and wherein said means to interlock said handle and first support means include a button extending laterally of each first support means and an opening formed in the distal ends of said handle legs and adapted to receive said button of the associated first support means.

3. A utility cart according to claim 2, wherein diametrically opposed buttons extend laterally of each said first support means and diametrically opposed openings are formed in each handle leg each to receive a button of the associated first support means.

4. A utility cart according to claim 2, wherein said shelf has at least one mating sleeve and wherein each of said first and second support means is formed with an exterior surface tapering outwardly and downwardly when said support means engages a corner post whereby each of said first and second support means is adapted to engage and support said mating sleeve of said shelf.

5. A utility cart according to claim 1 or 2, wherein the distal ends of said handle legs and opposing ends of said first pair of corner posts are tubular sections and each said coupling means has end sections adapted to fit, respectively, into said tubular sections of said legs and said first pair of corner posts, said coupling means having a radially extending flange between the ends of said coupling means abutting the ends of said legs and said first pair of corner posts to establish said coupling means between each leg and its associated corner post.

6. A utility cart according to claim 1 or 2, wherein each of said first and second support means comprises a pair of semi-tubular elements having interfitting portions permitting the elements to be joined around a corner post.

7. A utility cart according to claim 2 wherein said corresponding projection is a rib extending inwardly of said support means adjacent its lowermost end when said support means engages a corner post.

8. A utility cart comprising:
   first and second pairs of corner posts, the posts of at least one of said pairs being formed with a hollow tubular section at one end thereof;
   a U-shaped handle having a pair of elongate legs, the distal ends of which are formed with a hollow tubular section;
   coupling means formed with end sections adapted to fit, respectively, into said hollow tubular sections of said one of said pairs of corner posts and said sections of said handle; and
   support means adapted to engage the exterior of said posts against axial movement relative thereto thus to support a shelf in horizontal disposition between said corner posts, and being formed with means for interlocking with the distal ends of said handle thus to lock said handle against removal from said one of said pairs of corner posts.

9. A utility cart comprising:
a pair of corner posts, each of said corner posts being formed with a recess;
a handle having a pair of elongate legs;
coupling means for positioning the distal ends of said handle legs in aligned, proximate disposition with respect to the ends of said corner posts;
support means adapted to engage the exterior of said corner posts against axial movement relative thereto, each said support means being formed with a corresponding projection adapted to engage with the recess of a corner post; and
means associated with said support means and the distal ends of said handle legs to interlock said handle and said support means, said means to interlock said handle and support means including a button extending laterally of each support means and an opening formed in the distal ends of said handle legs and adapted to receive said button of the associated support means, whereby said handle and said corner posts are fixed against removal from said aligned, proximate disposition.

10. A utility cart according to claim 9, including a shelf, a second pair of corner posts, and support means adapted to engage the exterior of the posts of said second pair of corner posts against axial movement relative thereto, whereby said support means engaging said posts of said first and second pairs of corner posts are adapted to support said shelf in horizontal dispostion therebetween.

11. A utility cart according to claim 9, wherein diametrically opposed buttons extend laterally of each said support means and diametrically opposed openings are formed in each handle leg each to receive a button of the associated support means.

12. A utility cart according to claim 9, further comprising a shelf having at least one mating sleeve and wherein each said support means is formed with an exterior surface tapering outwardly and downwardly when said support means engages a corner post whereby said support means is adapted to engage and support said mating sleeve of said shelf.

13. A utility cart according to claim 9 or 10, wherein the distal ends of said handle legs and opposing ends of said corner posts are tubular sections and each said coupling means has end sections adapted to fit, respectively, into said tubular sections of said legs and a pair of corner posts, said coupling means having a radially extending flange between the ends of said coupling means abutting the ends of said legs and corner posts to establish said coupling means between each leg and its associated corner post.

14. A utility cart according to claim 9 or 10, wherein each said support means comprises a pair of semi-tubular elements having interfitting portions permitting the elements to be joined around a corner post.

15. A utility cart according to claim 9 wherein said corresponding projection is a rib extending inwardly of said support means adjacent its lowermost end when said support means engages a corner post.

16. A utility cart comprising:
a pair of corner posts;
a handle having a pair of elongate legs;
coupling means for positioning the distal ends of said handle legs in aligned, proximate disposition with respect to the ends of said corner posts, the distal ends of said handle legs and opposing ends of said corner posts being tubular sections and each said coupling means having end sections adapted to fit, respectively, into said tubular sections of said legs and a pair of corner posts, said coupling means having a radially extending flange between the ends of said coupling means abutting the ends of said legs and corner posts to establish said coupling means between each leg and its associated corner post;
support means adapted to engage the exterior of said corner posts against axial movement relative thereto; and
means associated with said support means and the distal ends of said handle legs to interlock said handle and said support means, whereby said handle and said corner posts are fixed against removal from said aligned, proximate disposition.

17. A utility cart according to claim 16, including a shelf, a second pair of corner posts, and support means adapted to engage the exterior of the posts of said second pair of corner posts against axial movement relative thereto, whereby said support means engaging said posts of said first and second pairs of corner posts are adapted to support said shelf in horizontal dispostion therebetween.

18. A utility cart according to claim 16, wherein each corner post is formed with a recess and each support means is formed with a corresponding projection adapted to engage with the recess of a corner post; and wherein said means to interlock said handle and support means include a button extending laterally of each support means and an opening formed in the distal ends of said handle legs and adapted to receive said button of the associated support means.

19. A utility cart according to claim 18, wherein diametrically opposed buttons extend laterally of each said support means and diametrically opposed openings are formed in each handle leg each to receive a button of the associated support means.

20. A utility cart according to claim 18, further comprising a shelf having at least one mating sleeve and wherein each said support means is formed with an exterior surface tapering outwardly and downwardly when said support means engages a corner post whereby said support means is adapted to engage and support said mating sleeve of said shelf.

21. A utility cart according to claim 16, 17 or 18, wherein each said support means comprises a pair of semi-tubular elements having interfitting portions permitting the elements to be joined around a corner post.

22. A utility cart according to claim 18 wherein said corresponding projection is a rib extending inwardly of said support means adjacent its lowermost end when said support means engages a corner post.

23. A utility cart comprising:
a pair of corner posts;
a handle having a pair of elongate legs;
coupling means for positioning the distal ends of said handle legs in aligned, proximate disposition with respect to the ends of said corner posts;
support means adapted to engage the exterior of said corner posts against axial movement relative thereto, each said support means comprising a pair of semi-tubular elements having interfitting portions permitting the elements to be joined around a corner post; and means associated with said support means and the distal ends of said handle legs to interlock said handle and said support means, whereby said handle and said corner posts are fixed against removal from said aligned, proximate disposition.

24. A utility cart according to claim 23, including a shelf, a second pair of corner posts, and support means adapted to engage the exterior of the posts of said second pair of corner posts against axial movement relative thereto, whereby said support means engaging said posts of said first and second pairs of corner posts are adapted to support said shelf in horizontal dispostion therebetween.

25. A utility cart according to claim 23, wherein each corner post is formed with a recess and each support means is formed with a corresponding projection adapted to engage with the recess of a corner post; and wherein said means to interlock said handle and support means include a button extending laterally of each support means and an opening formed in the distal ends of said handle legs and adapted to receive said button of the associated support means.

26. A utility cart according to claim 25, wherein diametrically opposed buttons extend laterally of each said support means and diametrically opposed openings are formed in each handle leg each to receive a button of the associated support means.

27. A utility cart according to claim 25, further comprising a shelf having at least one mating sleeve and wherein each said support means is formed with an exterior surface tapering outwardly and downwardly when said support means engages a corner post whereby said support means is adapted to engage and support said mating sleeve of said shelf corner.

28. A utility cart according to claim 23, 24 or 25, wherein the distal ends of said handle legs and opposing ends of said corner posts are tubular sections and each said coupling means has end sections adapted to fit, respectively, into said tubular sections of said legs and a pair of corner posts, said coupling means having a radially extending flange between the ends of said coupling means abutting the ends of said legs and corner posts to establish said coupling means between each leg and its associated corner post.

29. A utility cart according to claim 25 wherein said corresponding projection is a rib extending inwardly of said support means adjacent its lowermost end when said support means engages a corner post.

* * * * *